(12) United States Patent
Aikin et al.

(10) Patent No.: US 11,016,505 B2
(45) Date of Patent: May 25, 2021

(54) POWER CONNECTOR ASSEMBLY

(71) Applicant: Apple Inc., Cupertino, CA (US)

(72) Inventors: Randol W. Aikin, Sunnyvale, CA (US); Malcolm J. Northcott, Felton, CA (US)

(73) Assignee: Apple Inc., Cupertino, CA (US)

( * ) Notice: Subject to any disclaimer, the term of this patent is extended or adjusted under 35 U.S.C. 154(b) by 291 days.

(21) Appl. No.: 16/165,848

(22) Filed: Oct. 19, 2018

(65) Prior Publication Data

US 2019/0049996 A1 Feb. 14, 2019

Related U.S. Application Data

(62) Division of application No. 15/275,160, filed on Sep. 23, 2016, now Pat. No. 10,108,202.

(Continued)

(51) Int. Cl.

| *B60L 53/14* | (2019.01) |
| *B60L 15/42* | (2006.01) |
| *B60L 58/12* | (2019.01) |
| *B60L 53/16* | (2019.01) |
| *B60L 53/18* | (2019.01) |
| *B60L 53/34* | (2019.01) |
| *G05D 1/02* | (2020.01) |

(Continued)

(52) U.S. Cl.
CPC .......... *G05D 1/0293* (2013.01); *B60L 15/42* (2013.01); *B60L 53/14* (2019.02); *B60L 53/32* (2019.02); *B60L 58/12* (2019.02); *G08G 1/22* (2013.01); *B60L 2260/32* (2013.01); *B60L 2260/52* (2013.01); *G05D 2201/0213* (2013.01); *Y02T 10/70* (2013.01)

(58) Field of Classification Search
CPC .......... G05D 1/0293; G05D 2201/0213; B60L 53/32; B60L 53/14; B60L 58/12; B60L 15/42; B60L 2260/32; B60L 2260/52; B60L 2201/0213; G08G 1/00; G08G 1/16; G08G 1/22; Y02T 10/70; Y02T 90/12; Y02T 90/14; Y02T 10/7072
See application file for complete search history.

(56) References Cited

U.S. PATENT DOCUMENTS

| 6,032,097 | A | * | 2/2000 | Iihoshi | ................. | G05D 1/0293 701/96 |
| 6,813,561 | B2 | | 11/2004 | MacNeille et al. | | |

(Continued)

*Primary Examiner* — Yonel Beaulieu
(74) *Attorney, Agent, or Firm* — Robert C. Kowert; Kowert, Hood, Munyon, Rankin & Goetzel, P.C.

(57) ABSTRACT

A vehicle configured to be autonomously navigated in a peloton along a roadway, wherein the peloton comprises at least the vehicle at least one additional vehicle, is configured to determine a position of the vehicle in the peloton which reduces differences in relative driving ranges among the vehicles included in the peloton. The vehicles can dynamically adjust peloton positions while navigating to reduce driving range differences among the vehicles. The vehicle can include a power management system which enables the vehicle to be electrically coupled to a battery included in another vehicle in the peloton, so that driving range differences between the vehicles can be reduced via load sharing via the electrical connection. The vehicle can include a power connector arm which extends a power connector to couple with an interface of another vehicle.

20 Claims, 5 Drawing Sheets

Related U.S. Application Data

(60) Provisional application No. 62/232,853, filed on Sep. 25, 2015.

(51) Int. Cl.
*B60L 53/30* (2019.01)
*G08G 1/00* (2006.01)

(56) References Cited

U.S. PATENT DOCUMENTS

| | | |
|---|---|---|
| 8,676,466 B2 | 3/2014 | Mudalige |
| 8,774,981 B2 | 7/2014 | Paz-Meidan |
| 9,396,661 B2 | 7/2016 | Okamoto |
| 9,799,224 B2 | 10/2017 | Okamoto |
| 10,108,202 B1* | 10/2018 | Aikin .................. B60L 15/42 |
| 2004/0193372 A1 | 9/2004 | MacNeille et al. |
| 2010/0217485 A1* | 8/2010 | Ichishi ................ B60L 1/003 |
| | | 701/36 |
| 2014/0210646 A1 | 7/2014 | Subramanya |
| 2020/0231058 A1* | 7/2020 | Hishida ................ H02J 3/322 |
| 2020/0234575 A1* | 7/2020 | Hishida ............... G08G 1/0112 |

* cited by examiner

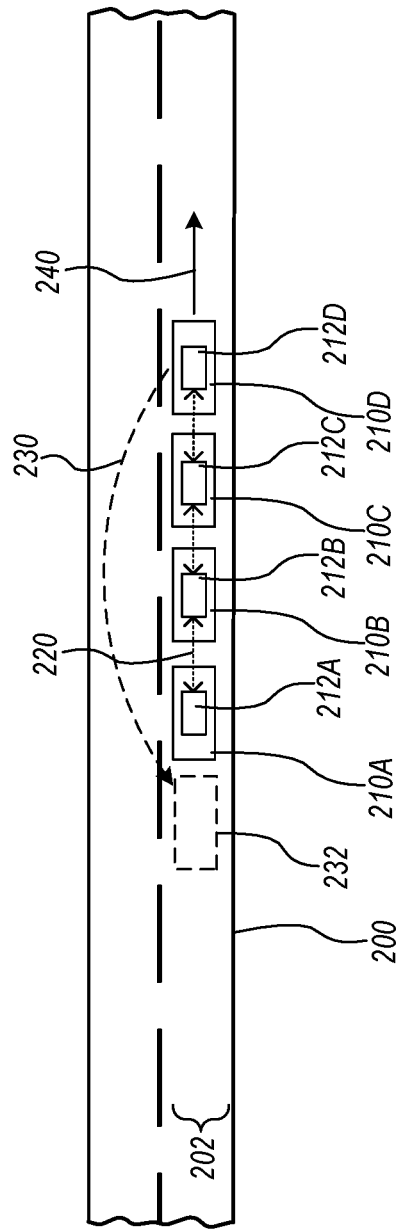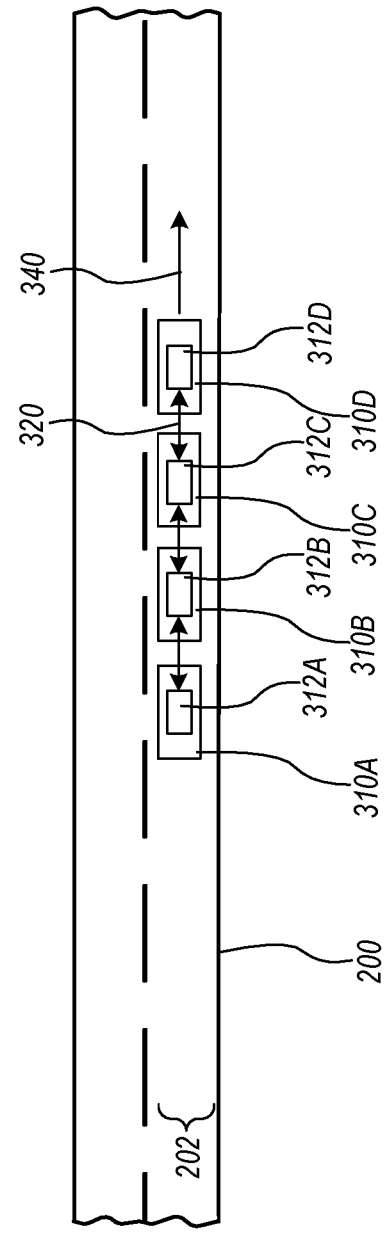

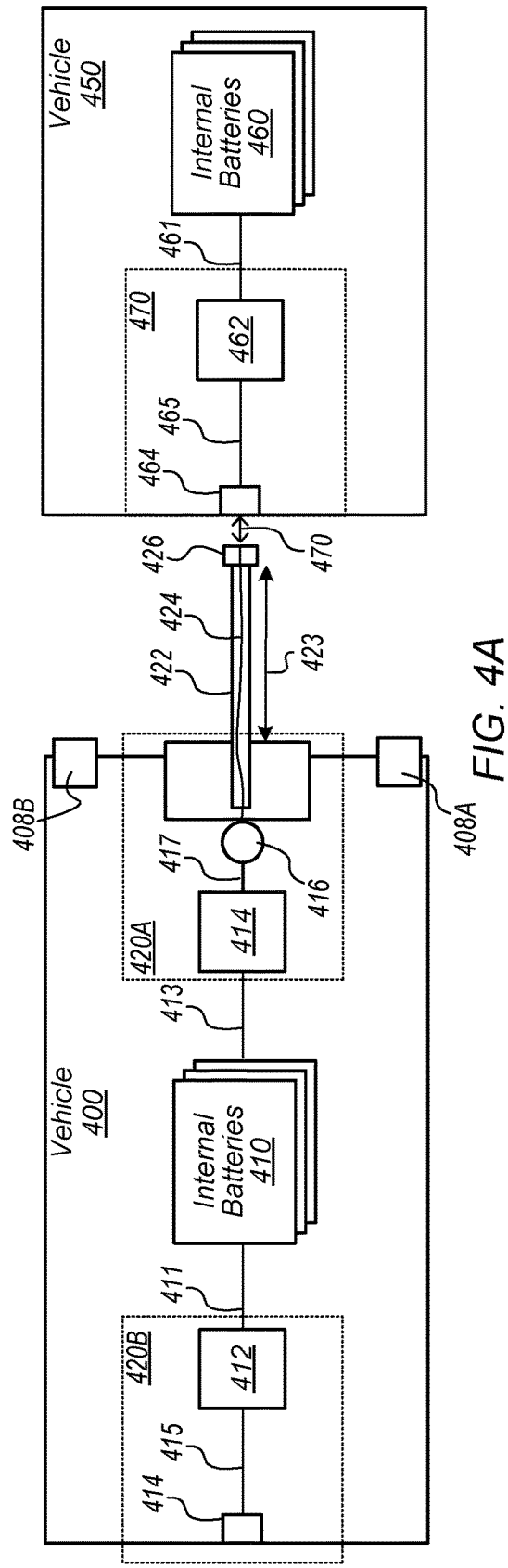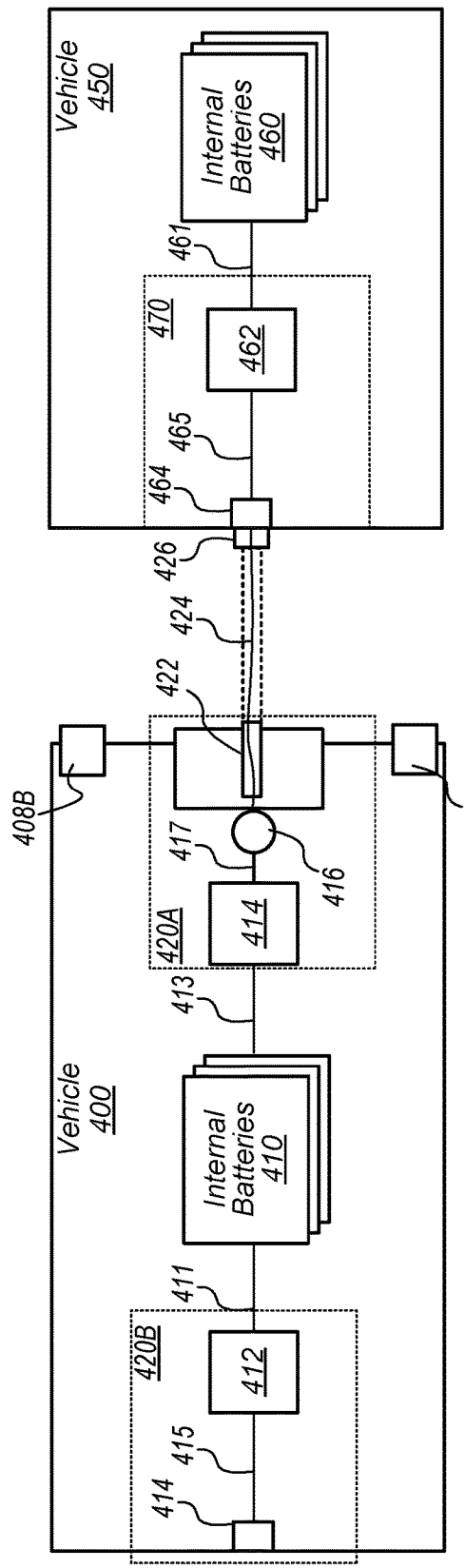

POWER CONNECTOR ASSEMBLY

This application is a Divisional of U.S. patent application Ser. No. 15/275,160, filed Sep. 23, 2016, now U.S. Pat. No. 10,108,202, which claims benefit to priority U.S. Patent Application Ser. No. 62/232,853, filed Sep. 25, 2015, each of which is hereby incorporated by reference herein in its entirety.

BACKGROUND

Technical Field

This disclosure relates generally to navigation and energy management of a vehicle, and in particular to a vehicle which can be autonomously navigated in a peloton configuration with another vehicle.

Description of the Related Art

The rise of interest in autonomous navigation of vehicles, including automobiles, has resulted in a desire to develop autonomous navigation systems which can autonomously navigate (i.e., autonomously "drive") a vehicle through various routes, including one or more roads in a road network, such as contemporary roads, streets, highways, etc. Such autonomous navigation systems can control one or more automotive control elements of the vehicle to implement such autonomous navigation. Such control by the autonomous navigation system in a vehicle can be referred to as autonomous driving control of the vehicle.

In some cases, a navigation range of a vehicle from a given location is at least partially restricted by the internal energy storage of the vehicle, which can include fuel, electrical power, etc., which are consumed by one or more engines included in the vehicle to cause the vehicle to move. While a vehicle can stop at a refueling station, recharging station, etc. to replenish internal stored energy to extend the navigation range of the vehicle, such stops can extend the duration of a trip. In addition, in some cases, such stations may be at least partially absent from a driving route along which the vehicle is navigated, thereby complicating navigation of the vehicle to a destination location which is beyond an initial navigation range of the vehicle. For example, where a vehicle includes electrical motors which move the vehicle via consumption of electrical power, replenishment of internal stored energy can include navigating the vehicle to an electrical charging station, but such stations may be absent along the present driving route of the vehicle, and recharging at such a station, even if located along the route, can be time consuming.

SUMMARY OF EMBODIMENTS

Some embodiments provide an apparatus which includes a vehicle configured to be autonomously navigated in a vehicular peloton along a roadway, wherein the vehicular peloton comprises at least the vehicle and at least one additional vehicle. The vehicle includes a vehicle navigation system. The vehicle navigation system, based on a comparison of driving ranges of each of the vehicle and the at least one additional vehicle, determines a particular configuration of the vehicular peloton, which comprises a particular peloton position in which the vehicle is navigated relative to the at least one additional vehicle, which reduces a difference of the relative driving ranges of at least the vehicle and the at least one additional vehicle as a result of different aerodynamic drag associated with different peloton positions in the particular configuration of the vehicular peloton. The vehicle navigation system also generates a set of control commands which cause the vehicle to be navigated in the vehicular peloton at the particular peloton position.

Some embodiments provide an apparatus which includes a vehicle power management system, installed in a vehicle, which electrically couples at least one battery installed in the vehicle to at least one power source installed in at least one additional vehicle while the vehicle is navigating along a roadway. The vehicle power management system includes a power connector, coupled to an end of a power cable electrically coupled to at least one internal battery installed in the vehicle, which couples with a power connector interface installed in the at least one additional vehicle, and a power connector arm which extends the power connector from a retracted position in the vehicle, and across a spacing distance between the vehicle and the at least one additional vehicle, to couple the power connector to the power connector interface.

Some embodiments provide a method which includes performing, by at least one computer system installed in a vehicle, electrically coupling an internal battery installed in the vehicle to at least one additional battery installed in at least one additional vehicle, based on coupling a power connector of the vehicle, which is electrically coupled to the internal battery, with a power connector interface of the at least one additional vehicle, which is electrically coupled to the at least one additional battery.

BRIEF DESCRIPTION OF THE DRAWINGS

FIG. 2 illustrates a schematic block diagram of a plurality of communicatively coupled vehicles navigating along a roadway in a vehicular peloton, according to some embodiments.

FIG. 3 illustrates a schematic block diagram of a plurality of electrically coupled vehicles navigating along a roadway in a vehicular peloton, according to some embodiments.

FIG. 4A-B illustrate schematic block diagrams of vehicles in a peloton which are electrically coupled via a power connector of a vehicle power management system of a vehicle being coupled to a power connector interface of another adjacent vehicle in the peloton, according to some embodiments.

DETAILED DESCRIPTION

Figure 1:
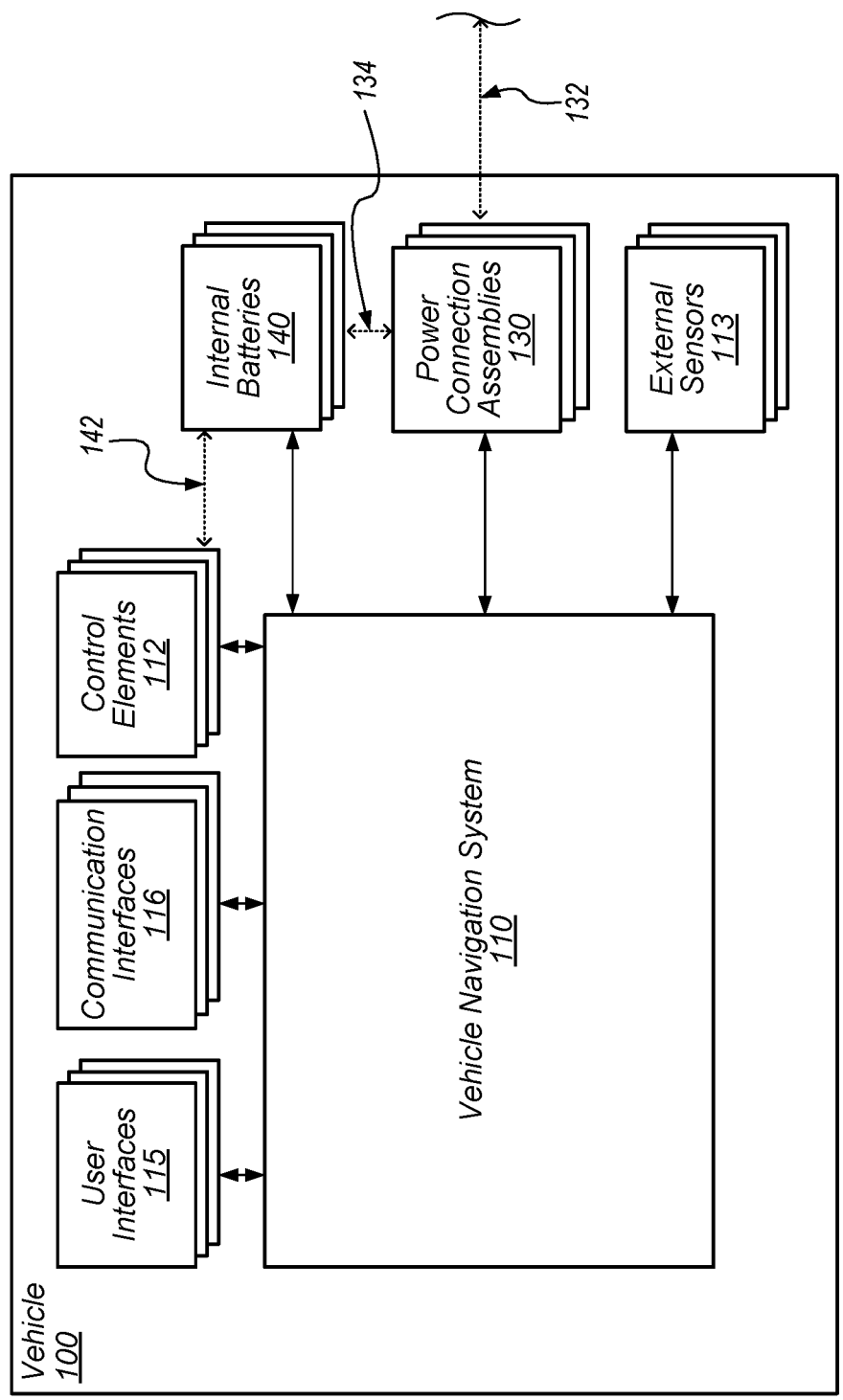
FIG. 1 illustrates a schematic block diagram of a vehicle which includes a vehicle navigation system and at least one power connection assembly, according to some embodiments.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 illustrates a schematic block diagram of a vehicle which includes a vehicle navigation system (VNS) and at least one power connection assembly, according to some embodiments. The VNS can control various control elements based on driving control commands generated at one or more user interfaces, navigation control modules, etc. The VNS, in some embodiments, is configured to autonomously generate autonomous driving control commands which control various control elements of the vehicle to autonomously navigate the vehicle along one or more driving routes.

Vehicle 100 will be understood to encompass one or more vehicles of one or more various configurations which can accommodate one or more occupants, including, without limitation, one or more automobiles, trucks, vans, etc. Vehicle 100 can include one or more interior cabins ("vehicle interiors") configured to accommodate one or more human occupants (e.g., passengers, drivers, etc.), which are collectively referred to herein as vehicle "occupants". A vehicle interior can include one or more user interfaces 115, including one or more manual driving control interfaces (e.g., steering device, throttle control device, brake control device), display interfaces, multimedia interfaces, climate control interfaces, some combination thereof, or the like.

Vehicle 100 includes various vehicle control elements 112 which can be controlled, via one or more of the interfaces 115 and the VNS 110, to navigate ("drive") the vehicle 100 through the world, including navigate the vehicle 100 along one or more driving routes. In some embodiments, one or more control elements 112 are communicatively coupled to one or more user interfaces 115 included in the vehicle 100 interior, such that the vehicle 100 is configured to enable an occupant to interact with one or more user interfaces 115, including one or more manual driving control interfaces, to control at least some of the control elements 112 and manually navigate the vehicle 100 via manual driving control of the vehicle via the manual driving control interfaces 115. For example, vehicle 100 can include, in the vehicle interior, a steering device, throttle device, and brake device which can be interacted with by an occupant to control various control elements 112 to manually navigate the vehicle 100.

Vehicle 100 includes a vehicle navigation system (VNS) 110 which is configured to generate control element commands which cause the vehicle 100 to be navigated though an environment. In some embodiments, a VNS is implemented by one or more computer systems. VNS 110 is communicatively coupled to at least some of the control elements 112 of the vehicle 100 and is configured to control one or more of the elements 112 to navigate the vehicle 100. Control of the one or more elements 112 to autonomously navigate the vehicle 100 can include VNS 110 generating one or more control element commands, also referred to herein interchangeably as control element signals. In some embodiments, a vehicle 100 in which a VNS 110 is located can be referred to as an "ego-vehicle", relative to the VNS 110.

In some embodiments, VNS 110 generates control element signals which cause one or more sets of control elements 112 to navigate the vehicle 100 through the environment based on input received at VNS 110 via one or more user interfaces 115. Such generation of control element signals can also referred to as manual driving control of the vehicle 100 at the VNS 110.

In some embodiments, VNS 110 autonomously generates control element signals which cause one or more sets of control elements 112 to navigate the vehicle 100 through the environment along a particular driving route. Such control can also be referred to as autonomous driving control of the vehicle 100 at the VNS 110. As used herein, autonomous navigation of the vehicle 100 refers to controlled navigation ("driving") of vehicle 100 along at least a portion of a route based upon autonomous driving control, by VNS 110, of the control elements 112 of the vehicle 100, including steering control elements, throttle control elements, braking control elements, transmission control elements, etc. independently of manual driving control input commands receiving from a user of the vehicle via user interaction with one or more user interfaces 115.

Vehicle 100 includes one or more communication interfaces 116 which are communicatively coupled with VNS 110 and are configured to communicatively couple VNS 110 to one or more remotely located systems, services, devices, etc. via one or more communication networks. For example, an interface 116 can include one or more cellular communication devices, wireless communication transceivers, radio communication interfaces, etc. VNS 110 can be communicatively coupled, via an interface 116, with one or more remotely located devices, services, systems, etc. via one or more wireless communication networks, including a cloud service. VNS 110 can communicate messages to a remotely located vehicle, service, system, etc., receive messages from the one or more remotely located vehicles, services, systems, etc., and the like via one or more interfaces 116. In some embodiments, communicatively coupling VNS 110 with a remote service, system, vehicle, device, etc. via interface 116 includes establishing a two-way communication link between the VNS 110 and the remote service, system, device, device, etc. via a communication network to which the interface 116 is communicatively coupled.

Vehicle 100 includes a set of one or more external sensor devices 113, also referred to as external sensors 113, which can monitor one or more aspects of an external environment relative to the vehicle 100. Such sensors can include camera devices, video recording devices, infrared sensor devices, radar devices, light-scanning devices including LIDAR devices, precipitation sensor devices, ambient wind sensor devices, ambient temperature sensor devices, position-monitoring devices which can include one or more global navigation satellite system devices (e.g., GPS, BeiDou, DORIS, Galileo, GLONASS, etc.), some combination thereof, or the like. One or more of external sensor devices 113 can generate sensor data associated with an environment, also referred to as sensor data representations of one or more portions of the environment, as the vehicle 100 navigates through the environment. Sensor data generated by one or more sensor devices 113 can be communicated to VNS 110 as input data, where the input data can be used by the VNS 100, when operating in autonomous driving control mode, to generate driving control signals which, when executed by control elements 112, cause the vehicle 100 to be navigated along a particular driving route through the environment. In some embodiments, VNS 110 communicates at least some sensor data generated by one or more sensors 113 to one or more remote systems, services, vehicles, devices, etc. via one or more interfaces 116.

In some embodiments, vehicle 100 includes a set of one or more internal batteries 140 which are electrically coupled 142 to one or more of the control elements 112 and supply electrical power which are consumed by the control elements 112 to navigate the vehicle 100. As also shown in FIG. 1, in some embodiments vehicle 100 includes one or more power connection assemblies 130 which are electrically coupled to one or more of the internal batteries 140 and can be coupled to one or more electrical power sources, including one or more batteries, which are located externally to the vehicle 100, thereby establishing an external electrical connection 132 between the vehicle 100 and the external power source. In some embodiments, electrical power can be supplied to one or more internal batteries 140 via connections 134, 132 and one or more power connection assemblies which are coupled to one or more external power sources. In some embodiments, electrical power can be supplied to an external device via which a power connection assembly 130 is coupled 132, from one or more internal batteries 140, via connections 134 and 132.

In some embodiments, one or more of the power connection assemblies 130 can establish an electrical connection 132 with an external device, which can include an external power source, battery, etc. while the vehicle 100 is in motion, including establishing an electrical connection with an external device which is also in motion.

VNS 110 can cause the vehicle 100 to be navigated through an environment based on autonomous driving control of the vehicle. VNS 110 can monitor one or more aspects of the exterior of the vehicle, via sensor data generated by one or more sensors 113. VNS 110 can generate control element signals which are executed by one or more control elements 112 to cause the vehicle 100 to be navigated. VNS 110 can establish a driving control mode and generate control element signals based on the present driving control mode of the VNS 110. The driving control mode can include one or more of a manual driving control mode and an autonomous driving control mode. In some embodiments, VNS 110 processes particular inputs to VNS 110 based on the present driving control mode of VNS 110. For example, where VNS 110 is in a manual driving control mode, VNS 110 can selectively generate control element signals based on manual driving control commands received at VNS 110 via one or more user interfaces 115. In another example, where VNS 110 is in an autonomous driving control mode, VNS 110 can generate control signals based on processing sensor data generated by one or more sensors 113 and a driving route along which the vehicle 100 is to be navigated, where VNS 110 can switch between autonomous driving control mode and manual driving control mode based on signals received from one or more interfaces 115. The driving route can be generated at VNS 110 based on input commands received from an interface 115, data received from one or more interfaces 116, etc. Where VNS 110 is in an autonomous driving control mode, VNS 110 can selectively ignore driving control commands received at VNS 110 from one or more interfaces 115.

In some embodiments, the VNS 110 can navigate the vehicle 100 along a driving route where the VNS 110 further navigates the vehicle 100, along at least a portion of the driving route, in a vehicular peloton with at least one additional vehicle. As referred to herein, a vehicular peloton which includes a plurality of vehicles can be referred to interchangeably as a peloton.

In some embodiments, VNS 110 can, in response to occupant interaction with one or more user interfaces 115, identify a peloton which is scheduled to navigate along at least a portion of a determined driving route to a destination location during a time period which at least partially overlaps with time period during which the vehicle 100 may be navigated along the driving route. The VNS 110 can prompt an occupant, via one or more interfaces 115, for authorization to adjust the driving route to navigate the vehicle in the peloton along at least a portion of the driving route to the destination location. The VNS 110 can identify a peloton scheduled to navigate along the route via communication, through one or more interfaces 116, with one or more external devices, vehicles, services, systems, etc. which are remotely located from the vehicle 100. The VNS 110 can communicate with one or more remotely located devices, vehicles, services, systems, etc. to request authorization to join the peloton. Upon navigating the vehicle 100 to within a particular proximity of the peloton, the VNS 110 can, based on receiving authorization to join the peloton, navigate the vehicle into a particular position in the peloton and navigate the vehicle along a driving route in the peloton. The VNS 110 can communicate with one or more portions of one or more other vehicles in the peloton and can navigate the vehicle 100 based on sensor data, driving commands, etc. received from one or more other vehicles in the peloton, one or more remotely located devices, services, systems, etc. Where the VNS 110 determines that an adjacent vehicle in the peloton includes a power connector interface, VNS 110 can communicate with the adjacent vehicle to request authorization to electrically couple a battery 140 with an internal power source included in the vehicle, where the internal power source of the adjacent vehicle can include one or more of an internal battery, a generator device, an engine, some combination thereof, etc. In response to receiving such an authorization, VNS 110 can control one or more of the assemblies 130, batteries 140, etc. to electrically couple 132 the one or more batteries 140 with the one or more internal power sources included in the adjacent vehicle.

In some embodiments, a VNS 110 determines whether to identify pelotons navigating along a driving route, prompt an occupant for authorization to join the peloton, attempt to electrically couple with an adjacent vehicle in the peloton, etc. based on personal data associated with the occupant in the vehicle. For example, an occupant can be associated with personal data which specifies that the VNS is to identify and autonomously attempt to join any identified peloton which is scheduled to navigate along a driving route to an occupant-specified destination location within a time period which at least partially overlaps with the time period during which the VNS 110 can navigate the vehicle 100 to the destination location from an occupant-specified start time. The personal data can specify a permissible margin of time period overlap. For example, where the personal data-specified margin is no more than 1 hour, the VNS 110 may attempt to schedule a navigation of the vehicle 100 along a driving route up to one hour later than initially specified by the occupant, where such scheduling enables the vehicle 100 to be navigated, to the destination location, at least partially in a peloton. In some embodiments, VNS 110 can selectively determine whether to attempt or accept electrically coupling the vehicle 100 with an adjacent vehicle in a peloton based on threshold stored energy levels, of one or more of the batteries 140, one or more internal power sources of the one or more adjacent vehicles, etc.

As a result, occupants, also referred to as users, can benefit from use of personal data, as use of such personal data enables users to influence and control whether the vehicle is navigated in a peloton, whether electrical power is shared between the vehicle and another vehicle in the peloton, etc.

Users, which can include occupants, can selectively block use of, or access to, personal data. A system incorporating some or all of the technologies described herein can include hardware and/or software that prevents or blocks access to such personal data. For example, the system can allow users to "opt in" or "opt out" of participation in the collection of personal data or portions of portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

In some embodiments, VNS 110 controls operation of one or more of the power connection assemblies, internal batteries, etc. to control the connection and disconnection of the power connection assembly 130 with one or more external devices, which can include one or more power connector interfaces included in one or more other vehicles, a transfer of electrical power between the internal battery 140 and one or more external devices via the connection 132 established via a power connection assembly 130, etc. The VNS 110 can selectively couple or decouple an assembly 130 based on executing an electrical coupling of the vehicle 100 with an external device, as part of navigating the vehicle 100 in a peloton in which the vehicle 100 can be electrically coupled with a power connector interface of at least one adjacent vehicle in the peloton, based on receiving an authorization signal indicating authorization of the vehicle 100 to electrically couple 132 with an adjacent vehicle, some combination thereof, etc.

FIG. 2 illustrates a schematic block diagram of a plurality of communicatively coupled vehicles navigating along a roadway in a vehicular peloton, according to some embodiments. The vehicles illustrated in FIG. 2 can include any of the embodiments of vehicles included herein, including vehicle 100 illustrated in FIG. 1.

In some embodiments, multiple vehicles 210A-D can be navigated along a roadway 200 in a serial configuration in a common roadway lane 202, referred to herein as a peloton, vehicular peloton, etc. The vehicles 210A-D in the peloton can be navigated along at least a portion of a roadway 200, where the roadway comprises at least a portion of separate driving routes being navigated by the separate vehicles, based on communication 220 between separate VNSs 212A-D of the separate vehicles 210A-D. Such communication can be referred to as vehicle-to-vehicle, or V2V, communication.

Navigating multiple vehicles along a roadway in a peloton, even where at least some of the vehicles are being navigated along the roadway 200 to separate destination locations, can augment driving ranges of the vehicles based on aerodynamic drag mitigation, which mitigates the amounts of energy which is expended by internal power sources of at least some of the vehicles. For example, in the peloton shown in FIG. 2, the vehicles 210A-D of the peloton navigate along roadway 200 lane 202 in a particular direction 240, so that vehicle 210D is a lead vehicle and vehicles 212A-D are trailing vehicles. Vehicle 212D can encounter aerodynamic drag as a result of being the lead vehicle in the peloton and encountering a volume of air before the other vehicles 210A-C, and the trailing vehicles 210A-C, based on trailing behind the lead vehicle 210D, encounter reduced aerodynamic drag. As a result, the expenditure of internal power sources by vehicles 210A-C is reduced as a result of being in the peloton, and the driving ranges of vehicles 210A-C are extended relative to the vehicles 210A-C navigating along the roadway 200 separately. In addition, in some embodiments, the presence of vehicle 212C reduces the turbulent wake generated by 212D and prevents laminar flow separation, thereby reducing internal power source expenditure by vehicle 210D and thus increasing the driving range of vehicle 210D. As a result, navigating vehicles 210A-D can augment the driving ranges of each of the vehicles 210A-D, relative to navigating the vehicles separately.

In some embodiments, the drain on internal power sources of vehicles 210A-D will be unequal, depending on the aerodynamic shapes of the vehicles. As a result, the stored energy levels, and thus driving range, of one particular vehicle may drop at a greater rate than that of other vehicles over time. In some embodiments, the vehicles 210A-D can dynamically adjust an arrangement of the vehicles 210A-D in the peloton based on the stored energy levels of the various vehicles 210. The arrangement of vehicles in a peloton can be referred to as a peloton configuration, and the configuration can be dynamically adjusted to manage the relative differences of stored energy levels, driving ranges, etc. of the various vehicles in the peloton. The configurations can be adjusted based on the relative differences in stored energy levels, driving ranges, etc. of the various vehicles in the peloton, so that the relative differences are reduced, minimized, some combination thereof, etc.

For example, depending on the aerodynamic shapes of the vehicles, vehicle 210D may encounter the most drag as lead vehicle. In this case, the relative difference between the driving ranges of vehicles 210A-C and vehicle 210D can increase as a result of vehicle 210D encountering more aerodynamic drag as the lead vehicle. The vehicles 210 can, based on the relative difference in driving range reaching a threshold level, determine and execute a new peloton configuration where vehicle 210 temporarily exits the peloton and navigates 230 to a new position 232 in the peloton, in accordance with a new peloton configuration which results in vehicle 210C becoming the lead vehicle and encountering increased drag, while vehicle 210D encounters less drag than when vehicle 210D was the lead vehicle. Such adjustments of peloton configuration can be implemented based on communication between the VNSs 212A-D of the vehicles 210A-D and can result in the respective energy loads borne by the separate vehicles 210A-D being balanced over time so that relative differences in driving range, stored energy levels, etc. of the various vehicles are maintained within a certain margin level, minimized, reduced, etc. Managing the relative differences in driving range via dynamic peloton configuration adjustment can result in increasing the driving ranges of the various vehicles 210A-D of the peloton, thereby enabling vehicles to navigate further without replenishing internal energy levels, stored electrical power, fuel, etc.

In some embodiments, one or more vehicle navigation systems included in one or more of the vehicles included in a peloton can, individually, at least partially collectively, etc., dynamically adjust the distance between any two vehicles participating in the peloton to minimize the total aerodynamic drag of the peloton. The optimal distance between vehicles may depend on a variety of factors, including the shape of the vehicles, the speed, the presence of crosswinds, the relative pressure, the presence of other vehicles on the roadway, etc. Dynamically adjusting the distance of the vehicles may be accomplished via a control method that monitors the power expenditure of the powertrain of each vehicle and adjusts the distance between the vehicles to minimize the total power expenditure. Control of the distance, measured by one or more onboard sensors, can be performed via some control algorithm implemented by one or more of the vehicle navigation systems included in one or more of the vehicles navigating in the peloton, such as fuzzy logic, sliding mode control, model predictive control, etc. Additionally, the following distance may be further weighted according to other factors, including as safety, privacy, local regulations, traffic conditions, etc.

In some embodiments, a vehicle navigation system included in a vehicle is configured to dynamically adjust a shape of the vehicle. The vehicle navigation system can use one or more control algorithms to optimally configure the physical characteristics of each participant to minimize the total aerodynamic drag. This may include the ride height of the vehicles, adjustable via air suspension or hydraulic leveling, or deployable body panels, such as spoilers, fins, etc. The optimal configuration of these elements can depend on a variety of factors, including the position of the vehicle within the peloton, the environmental conditions, the vehicle speed, etc. These may be optimally configured via a gradient control algorithm.

In some embodiments, one or more vehicle navigation systems included in one or more vehicles navigating in a peloton are configured to, individually, at least partially collectively, etc., adjust the speed of the peloton according to one or more of efficiency, traffic regulations, road conditions, etc. For instance, when the number of vehicles navigating in the peloton, also referred to herein as participants in the peloton, is low, the speed of the peloton may be lower, giving additional participants the opportunity to join the peloton. With additional participants, the speed of the peloton can be increased without increasing the average per-vehicle power loss due to aerodynamic drag.

In some embodiments, one or more vehicle navigation systems included in one or more vehicles navigating in a peloton are configured to, individually, at least partially collectively, etc., adjust the peloton configuration to arrange the order of the participants to minimize the total energy required to transport the peloton. This may depend on the aerodynamic shape of the participant vehicles. It may also depend on the intended destination of each participant vehicle. For example, if a participant's route allows participation in the peloton for only a brief period of time, the determined peloton configuration can include that particular participant navigating at a peloton position which is located at a trailing end of the peloton to minimize the energy expenditure associated with disrupting the peloton chain.

FIG. 3 illustrates a schematic block diagram of a plurality of electrically coupled vehicles navigating along a roadway in a vehicular peloton, according to some embodiments. The vehicles illustrated in FIG. 3 can include any of the embodiments of vehicles included herein, including vehicle 100 illustrated in FIG. 1.

In some embodiments, at least some of the vehicles in a peloton can be directly coupled, via one or more connections, which can include one or more electrical connections, so that electrical power stored, generated, etc. by respective internal power sources, batteries, power supplies, some combination thereof, etc. of the electrically coupled vehicles in the peloton can be transferred between the coupled vehicles, thereby enabling electrical power to be shared between the coupled vehicles. Such transfer of electrical energy between vehicles in a peloton can enable differences between the power consumption of the vehicles in the peloton to be reduced, such that power consumption by the vehicles in the peloton can be at least partially balanced, across at least some of the vehicles in the peloton, independently of adjusting the peloton configuration. Such transfer of electrical energy can also extend the driving distance of the entire peloton, rather than being limited by the vehicle with the least remaining electrical energy. For example, as shown in FIG. 3, where vehicles 310A-D each include a separate internal battery 312A-D and are navigating in direction 340 in a peloton, and where the vehicles 310A-D are each coupled to adjacent vehicles in the peloton via electrical connections 320, electrical power can be transferred between the internal batteries 312A-D of the vehicles. In the instance where vehicle 310D consumes more power than vehicles 310A-C, due to increased relative aerodynamic drag encountered as a result of being the lead vehicle, electrical power can be supplied to the battery 312D of vehicle 310D from one or more of the batteries of vehicles 310A-C, thereby at least partially mitigating the effect of the increased electrical load of the vehicle 310D, thereby enabling the vehicles 310A-D in the peloton to navigate along one or more driving routes which exceed the respective driving ranges of the separate vehicles.

In some embodiments, a peloton can include a dedicated peloton vehicle which can supply electrical power to some or all of the vehicles in the peloton, determine a peloton configuration of the peloton, selectively authorize vehicles joining and leaving the peloton, generating driving route data and communicating the data to vehicles in the peloton to navigate in accordance, some combination thereof, etc. The dedicated peloton vehicle can include a lead vehicle in the peloton. For example, vehicle 310D can be a dedicated peloton with an internal battery 312 which stores an amount of electrical energy that is substantially greater than the energy stored by batteries 312A-C, and the lead vehicle 310D can supply electrical power to the batteries 312A-C of vehicles 310A-C in the peloton via the electrical connections 320. As a result, the dedicated peloton vehicle 310D can enable vehicles 310A-C to navigate along a driving route which exceeds the respective driving ranges of the separate vehicles 310A-C without necessitating energy replenishment at a fixed energy replenishment facility, including a recharging station. Additionally, the lead vehicle may have an aerodynamically optimized exterior to provide a long aerodynamic wake, thereby further reducing the aerodynamic drag of the peloton.

FIG. 4A-B illustrate schematic block diagrams of vehicles in a peloton which are electrically coupled via a power connector of a vehicle power management system of a vehicle being coupled to a power connector interface of another adjacent vehicle in the peloton, according to some embodiments. The vehicles illustrated in FIG. 4A-B can include any of the embodiments of vehicles included herein, including vehicle 100 illustrated in FIG. 1.

In some embodiments, a vehicle includes a power connector assembly which includes one or more of a power connector which is electrically coupled to an internal battery of the vehicle, a power connector interface which is electrically coupled to the internal battery of the vehicle, some combination thereof, etc. A power connector installed in one vehicle can be coupled to a power connector interface installed in another vehicle, thereby enabling internal batteries of the at least two vehicles to be electrically coupled and further enabling electrical power transfer between the internal batteries of the coupled vehicles.

FIG. 4A-B illustrate vehicles 400 and 450 which are navigating in a peloton, where the vehicles 400, 450 are navigating in respective peloton positions, according to a peloton configuration, which results in vehicles 400, 450 being adjacent vehicles relative to each other. As shown, vehicles 400, 450 each include respective internal batteries 410, 460 which can be electrically coupled to control elements of the respective vehicles, including motors, such that the respective batteries 410, 460 of the respective vehicles each supply power to the respective control elements of the respective vehicles to cause the respective vehicles to navigate along a driving route, including navigate in the peloton.

As shown, each vehicle includes at least one power connector assembly 420A-B, 470, where each power connector assembly in a vehicle is electrically coupled to at least one internal battery of the respective vehicle. As shown, vehicle 450 includes a power connector assembly 470 which includes a power connector interface 464 and a set of power transmission lines 465, 461, which can include one or more power cables, power busses, etc. which electrically couple interface 464 to the one or more batteries 460. As also shown, the assembly 470 can include a power converter device 462 which can change the voltage of electrical power passing between interface 464 and batteries 460 via lines 465, 461. In some embodiments, converter 462 includes a direct current (DC) to DC converter which decreases ("steps down") the voltage of power being supplied from interface 464 to battery 460 and further increases ("steps up") the voltage of power being supplied from battery 460 to interface 464. As a result, electrical power which is exchanged between vehicles via the power connector assembly has a higher voltage, and thus a lower current, than the electrical power received and supplied at the batteries. A lower current of power which passes between the vehicles can be advantageous, because thinner, thus more flexible, and lighter electrical conductors can be used. For instance at 333V, the transfer of 100 kW of power may require 300 amps and may require 000 gauge wire, but at 3.3 kV the transfer may require only 30A, and may be accomplished with 14 gauge wire. The lower current may allow for much higher contact resistance in connectors, enabling connectors to be more resilient to wear and contamination.

High voltage transmission between vehicles may be attractive in one or more embodiments where a lead vehicle in a peloton comprises a specialized peloton leader, also referred to herein as a dedicated leader vehicle, that comprises one or more batteries which have sufficient battery capacity to maintain at least a minimum charge level, also referred to herein as a minimum amount of stored electrical energy, energy storage which at least meets a minimum proportion of full energy storage, some combination thereof, etc., of all the peloton vehicles while en-route along a driving route. In some embodiments, a peloton which includes such a dedicated leader vehicle can comprise a high power flow through the peloton chain, as the dedicated leader vehicle may be supplying enough energy to drive all of the peloton vehicles. The dedicated leader vehicle may further be supplying sufficient energy to recharge the batteries of one or more of the peloton vehicles. Such an amount of energy being supplied by the dedicated leader vehicle may be in the range of 25 kW per vehicle in the peloton. In some embodiments, one or more of the internal batteries of the dedicated leader vehicle can be configured to operate at much higher voltage, thus reducing the number of power conversions and the mass of internal and external wiring in one or more of the vehicles navigating in the peloton.

As shown, vehicle 400 includes a power connector assembly 420B which, similarly to assembly 470, includes a power connector interface 414, a DC power converter 412, and power transmission lines 415, 411 which couple the interface 414 to the internal batteries 410 via converter 412.

In addition, vehicle 400 includes a power connector assembly 420A which includes a power connector 426 which can couple with a power connector interface 464. The power connector 426 is coupled to a power cable 424 which is coupled, via one or more lines 413, 417 and components 414, 416, to the internal batteries 410. As a result, the power connector 426 is electrically coupled to the batteries 410. As the power connector 426 can couple with the power connector interface 464 in the assembly 470 of vehicle 450, the power connector 426 can, based on coupling with interface 464, electrically couple the internal batteries 410, 460 of the vehicles 400, 450, which can enable electrical power transfer between the internal batteries 410, 460 of the adjacent and electrically coupled vehicles 400, 450.

The assembly 420A is further shown to include a retraction device 416. The retraction device can exert a pulling force on connector 426 via cable 424, where the device 416 retracts the cable 424 and thus retracts the coupled connector 426 to a retracted position in the vehicle, absent a countering force. In some embodiments, the retraction device 416 coils the cable 422 into a coil configuration.

As shown, power connector assembly 420A includes a power connector arm 422 which can be reversibly extended and retracted. The arm 422, in some embodiments, extends, from a retracted position shown in FIG. 4B, to an extended position shown in FIG. 4A. The power connector arm 422, in some embodiments, comprises one or more of an articulated arm device, a telescoping cylindrical rod device, etc. Where the arm 422 includes a telescoping rod device, the device can be hollow, and the cable 424 can extend through the hollow interior of the arm, as shown in FIG. 4A-B.

As shown, in some embodiments, the power connector 426 of assembly 420A is held against a distal end of the arm 422 when the connector 426 is decoupled from interface 464. The arm 422 may include a coupling device which can couple with the connector 426 when the distal end of the arm 422 is in contact with the connector. In some embodiments, the retraction device 416 exerts a pulling force on the connector 426 which pulls the connector against the distal end of the arm 422, in the absence of a countering force, including a force holding the connector 426 together with the interface 464, as shown in FIG. 4B.

In some embodiments, the arm 422 extends, from a retracted position, across a spacing distance 423 between the vehicles 400, 450 in the peloton, so that the connector 426, held against a distal end of the arm 422, is extended from a retracted position in the vehicle 400 and at least partially across the spacing distance 423. When the arm 422 is extended to an extended position, the connector 426 is similarly positioned in an extended position which positions the connector 426 proximate 470 to the interface 464 of vehicle 450. In some embodiments, one or more portions of vehicle 400, including a VNS, controls assembly 420A and extends the arm 422 as shown in FIG. 4A, so that the connector 426 is positioned proximate to interface 464, based on one or more of identifying the interface 464 on a proximate end of vehicle 450 which is proximate to the end of vehicle 400 which is proximate to vehicle 450, a determination that at least assembly 430 of the vehicle 400 is located within a certain proximity of the interface 464 of the adjacent vehicle 450, a determination than an authorization message authorizing electrically coupling vehicles 400, 450 is received from one or more remote vehicles, deices, systems, services, etc. (which can include vehicle 450), some combination thereof, etc. Vehicle 400 includes sensor devices 408A-B which can monitor at least a portion of the external environment, and the VNS can control the arm 422 based on determining, based on processing sensor data generated by sensors 408A-B, that the assembly 430 is located within a certain proximity of the assembly 470 of vehicle 450 which includes an interface 464 with which connector 426 can be coupled.

Coupling connector 426 with interface 464 can include extending the arm 422 so that the connector 426 is positioned at least proximately to interface 464. In some embodiments, the arm 422 can be controlled to extend the connector 426 across the spacing distance 423 can couple the connector 426 with the interface 464. In some embodiments, the arm 422 positions the connector 426 at a position which is proximate to the interface 464 where the connector 426 remains decoupled from the interface 464, and the VNS included in the vehicle 400 navigates the vehicle 400 to reposition the connector 426 relative to interface 464 so that connector 426 is coupled with interface 464 based on navigation of the vehicle 400. In this way, the mechanical complexity of the arm 422 may be reduced, articulating in only a single degree of freedom.

Connector 426 can include one or more various connector devices which couple connector 426 with interface 464. In some embodiments, the connector 426 includes a magnetic coupling component which couples connector 426 to interface 464, based on magnetic force attraction between connector 426 and interface 464, when connector 426 approaches within a certain proximate 470 of the interface 464. In some embodiments, one or more of the connector 426 and the interface 464 includes one or more sensor devices which can be used by one or more VNSs of one or more of the vehicles 450 to control one or more of the assemblies 420A, 470, the vehicles 400, 450, etc. to cause the connector 426 and interface 464 to be coupled.

Subsequently to connector 426 and interface 464 becoming coupled, and based on verification that such coupling has occurred, the VNS of vehicle 400 can cause the arm 422 to be retracted to a retracted position, as shown in FIG. 4B. As the connector 426 remains coupled to interface 464, the power cable 424 extends across the spacing distance between vehicles 400, 450. The cable can be flexible, so that vehicles 400, 450 can be navigated at least partially separately, including navigating the vehicles so that the vehicles vary in relative positions, while maintaining the electrical connection between vehicles 400, 450.

Where vehicles 400, 450 are electrically coupled via connector 426 and interface 464, electrical power can be transferred between the batteries 410, 460 of the vehicles. For example, where an amount of electrical power stored in battery 410 is less than the electrical power stored in battery 460, electrical power can be supplied from battery 460 to battery 410 to reduce, minimize, etc. a difference in stored electrical energy between the batteries of vehicles 400, 450. In another example, where a driving range of vehicle 400, based on the stored electrical energy in battery 410, is less than that of vehicle 450, electrical power can be supplied from battery 460 to battery 410 to reduce, minimize, etc. a difference in driving range between vehicles 400, 450.

As shown, vehicle 400 includes two assemblies 420A-B which are coupled to battery 410, where assembly 420 includes a power connector interface 414. As a result, vehicle 400 can be electrically coupled to another adjacent vehicle navigating in a common peloton with vehicles 400, 450, and electrical power can be transferred between battery 410 and an internal battery, power source, etc. of another vehicle coupled to vehicle 400 via interface 414. In some embodiments, electrical power can be supplied to battery 410 from multiple vehicles, including vehicle 450, via assemblies 420A-B which are coupled to the separate vehicles. In some embodiments, electrical power can be supplied from battery 410 to multiple vehicles, including vehicle 450, via assemblies 420A-B which are coupled to the separate vehicles. In some embodiments, electrical power can be supplied between the vehicles coupled to vehicle 400, via the assemblies 420A-B and lines 411, 413, where the vehicle 400 serves as an intermediary in transferring electrical power between vehicles which are indirectly electrically coupled via vehicle 400.

Electrically decoupling vehicles 400, 450 can include extending the arm 422 to an extended position, decoupling the connector 426 from the interface 464, and retracting the arm 422 to a retracted position, so that the connector 426 is retracted to a retracted position.

In some embodiments, the connector 426 can be decoupled from interface 464 independently of extending arm 422, and a retracting device 416 can pull the cable 424 and connector 426 to a retracted position.

In some embodiments, a power connector assembly included in a vehicle includes an inductive charging device which is configured to transfer power to a power connector assembly in an adjacent vehicle via inductive charging. In some embodiments, power can be transferred between vehicles optically via use of high efficiency lasers coupled to one or more of the vehicles to feed power into optical fibers included in one or more of the vehicles, and high efficiency photovoltaic devices included in one or more of the vehicles to recover the power. In the case of optical coupling, part of the energy transfer could be in free space, thus at least partially eliminating the need for a physical connection between vehicles to enable power transfer between the vehicles. In some embodiments, power could also be transferred between vehicles, using microwave links, using one or more of free space coupling between vehicles, using flexible wave guides, some combination thereof, etc. Free space coupling between vehicles can be at least partially implemented via use of one or more beam steering devices included in one or more of the vehicles. In some embodiments, where the peloton includes a dedicated lead vehicle, power may be converted to microwave at the lead vehicle and then transmitted down the peloton chain via a series of waveguides. One or more of the peloton participants may extract energy directly from the waveguide, while letting the remaining energy pass through to following vehicles.

Figure 5:
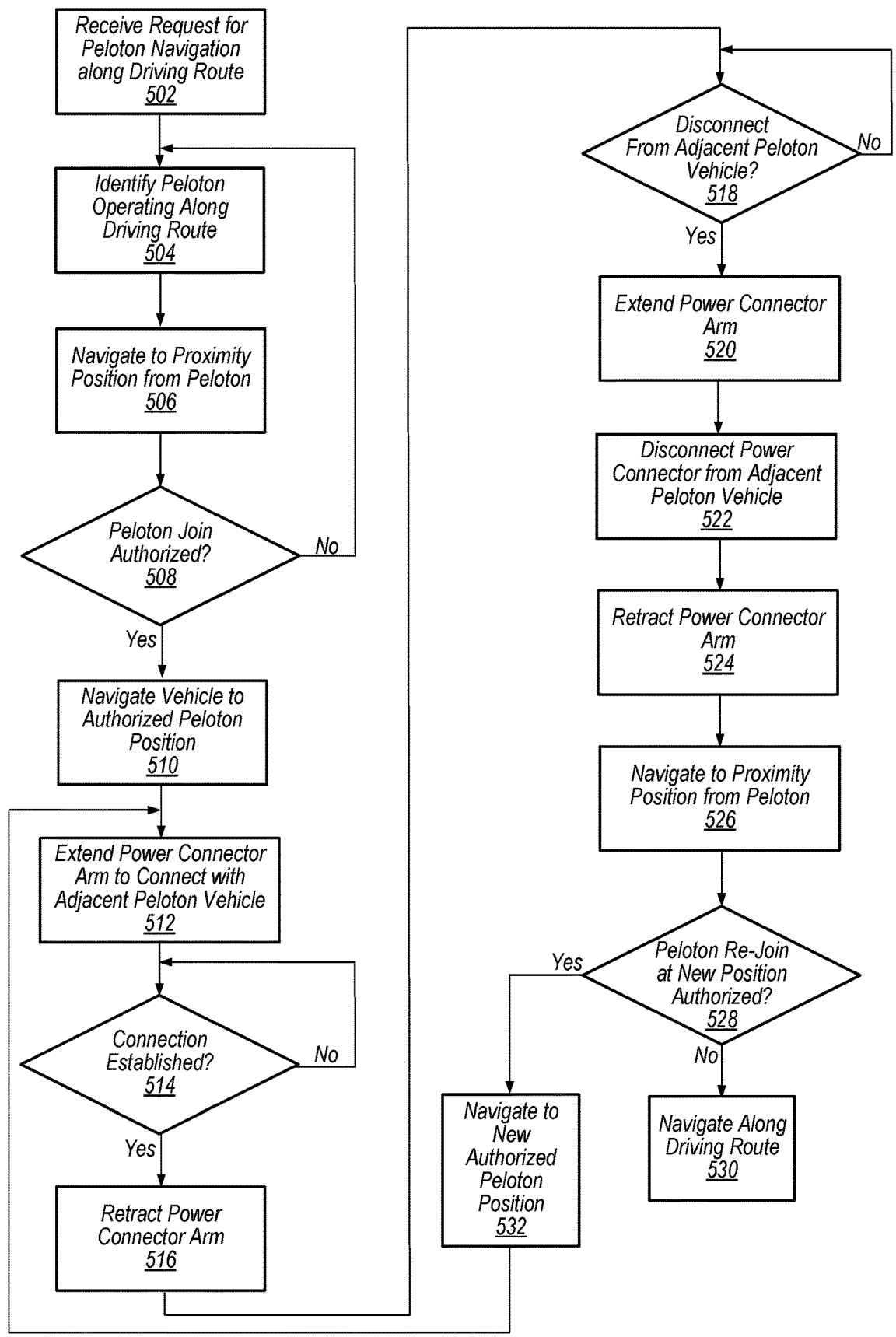
FIG. 5 illustrates navigating a vehicle in a vehicular peloton, according to some embodiments.

FIG. 5 illustrates navigating a vehicle in a vehicular peloton, according to some embodiments. The navigating can be implemented by one or more vehicle navigation systems installed in one or more vehicles included in the vehicular peloton, and the one or more vehicle navigation systems can be implemented by one or more computer systems.

At 502, a request to navigate a vehicle along a driving route in a vehicular peloton is received. The request can be received as a result of vehicle occupant interaction with one or more user interfaces included in the vehicle. The request can include a request to navigate the vehicle along the driving route at a particular time period. At 504, a peloton navigating along the driving route is identified. The peloton can be identified based on communication with a remotely located peloton service, one or more separate vehicles, etc. via one or more communication networks. A peloton which is scheduled to navigate along the driving route at a time period which at least partially overlaps with the particular time period can be identified. In some embodiments, a peloton which is presently navigating along the driving route can be identified, based on communication between the vehicle and a remote peloton service which is receiving position data from vehicles presently navigating in the peloton.

At 506, the vehicle is navigated to a proximity position relative to the peloton. The navigating can include a vehicle navigation system determining a driving route along which to navigate the vehicle to arrive at a proximity position relative to the peloton and generating commands, based on the driving route, which are transmitted to control elements of the vehicle and which are executed by the control elements to cause the vehicle to be navigated along the driving route. Where the peloton is in motion along a roadway, the proximity position relative to the peloton can be a position which moves along with the peloton, such that the proximity position remains within a certain margin of a particular distance relative to one or more particular portions of the peloton.

At 508, a determination is made regarding whether joining the peloton, by the ego-vehicle, is authorized. Such a determination can be made based at least in part upon communication between the ego-vehicle and one or more vehicles presently navigating in the peloton, communication between the ego-vehicle and one or more remotely located systems, services, etc. including a remotely located peloton service which is implemented by one or more computer systems separate from a vehicle, etc. Where the peloton includes a dedicated leader vehicle, the determination can be made based at least in part upon communication between the ego-vehicle and the dedicated leader vehicle. Such communication can include a request to join the peloton being communication from the ego-vehicle to one or more remotely located systems, services, one or more peloton vehicles, a peloton leader vehicle, some combination thereof, etc. A request to join the peloton can be transmitted, where the request includes one or more of information identifying the ego-vehicle, information identifying an occupant of the ego-vehicle, information identifying a driving route along which the vehicle is navigating, information indicating a driving range of the vehicle, information indicating a presence of one or more power connector assemblies in the ego-vehicle, some combination thereof, etc.

If, at 510, a message is received at the ego-vehicle which includes information indicating that a joining of the peloton is authorized, the vehicle is navigated to a particular position in the peloton. In some embodiments, the particular position is specified in the authorization message. In some embodiments, the particular position is determined in response to receipt of the authorization message. The authorization message can be received from one or more of a vehicle navigating in the peloton, a peloton leader vehicle navigating in the peloton, a remotely located peloton service, system, etc. some combination thereof, etc.

Identification of an authorized peloton position can include determining a target configuration of the peloton, which includes a particular arrangement of the present peloton vehicles and the ego-vehicle. The target configuration can include a configuration which is determined to reduce relative differences in one or more of driving ranges, internal stored driving energy levels, internal stored electrical power amounts, some combination thereof, etc. of the vehicles and the ego-vehicle in the peloton. The authorized peloton position can include a particular target position of the ego-vehicle within the peloton, in the target configuration of the peloton.

Navigating the ego-vehicle to the authorized peloton position can include verifying that the position is available to be occupied by the ego-vehicle. For example, where the position is a "tail" position in the peloton, the verifying can include verifying, based on processing sensor data generated by one or more sensor devices in one or more of the ego-vehicle, present peloton vehicles, etc. that the tail position is unoccupied by other vehicles, that the ego-vehicle can navigate to the tail position within intersecting one or more traffic participants, etc. In another example, where the position is located between two peloton vehicles, the verifying can include verifying that the two vehicles have moved apart to expose the position sufficiently to enable the ego-vehicle to navigate into the position. The target peloton configuration can be communicated to the present peloton vehicles and can include a command to the VNS of the peloton vehicles to navigate the vehicles to arrange the vehicles in accordance with the target peloton configuration, and the present peloton vehicles can, in response, be navigated to the associated positions of the respective vehicles which are specified in the target peloton configuration.

At 512, where the ego-vehicle includes a power connector assembly, the ego-vehicle is electrically coupled to an adjacent vehicle in the peloton via extension of a power connector arm included in a power connector assembly from a retracted position to an extended position, where extending the arm includes extending a power connector which is electrically coupled to an internal ego-vehicle battery via a power cable to an extended position which may at least partially span across a spacing distance between the ego-vehicle and the adjacent vehicle. The extension 512 can be executed based on determining, as a result of processing sensor data generated at the vehicle, processing data received from the adjacent vehicle, some combination thereof, etc., that the adjacent vehicle includes a power connector interface with which the power connector can couple, that coupling between the ego-vehicle and adjacent vehicle is authorized, some combination thereof, etc.

Extending the power connector arm, from a retracted position, can extend the power connector to a position which is proximate to a power connector interface of the adjacent vehicle. The extending at 512 can further include adjusting a position of the power connector relative to the power connector interface to cause the power connector to couple with the power connector interface. Such adjusting can include controlling the power connector arm to move the power connector to couple with the power connector interface, navigating the vehicle to move the power connector, relative to the adjacent vehicle, so that the power connector is caused to couple with the power connector interface, some combination thereof, etc.

At 514 and 516, if power connector is determined to be coupled to the power connector interface, such that a connection between an internal battery of the ego-vehicle and an internal battery of the adjacent vehicle is established, the power connector arm is retracted to a retracted position, so that the power connector remains coupled to the power connector interface of the adjacent vehicle and a power cable which couples the power connector to at least a portion of the ego-vehicle spans the spacing distance between the ego-vehicle and the adjacent vehicle.

At 518, a determination is made regarding whether the ego-vehicle is to electrically decouple from the adjacent peloton vehicle with which it is coupled via the power connector. The determination can be based on a determination regarding whether an updated target peloton configuration is received, where the position of the ego-vehicle in the target peloton configuration, relative to the coupled adjacent vehicle, is different from position in the present peloton configuration. The determination can be based on a determination regarding whether the ego-vehicle is commanded to exit the peloton.

At 520, the power connector arm is extended, from the retracted position to the extended position so that the power connector arm is configured to at least partially structurally support a present position of the power connector relative to the ego-vehicle. The power connector arm, in some embodiments, is configured to reversibly couple with the power connector, so that extending the power connector arm to the coupled power connector includes coupling the power connector arm with the power connector.

At 522, the power connector is decoupled from the power connector interface of the adjacent peloton vehicle, so that the ego-vehicle is electrically decoupled from the adjacent vehicle. Decoupling the power connector can include navigating the vehicle to cause the power connector to be pulled away from the power connector interface by the vehicle, activating a decoupling mechanism included into the power connector to cause the power connector to be decoupled, some combination thereof, etc.

At 524, based on a determination that the power connector is decoupled from the power connector interface, the power connector arm is retracted to a retracted position, so that the power connector is also retracted to a retracted position as a result. In some embodiments, the power cable coupled to the power connector is coupled to a retraction device which exerts a pulling force on the power connector via the cable. Where the power connector arm is extended and is at least in contact with the power connector, the arm can exert a countering pushing force which balances the pulling force of the retraction mechanism to cause the power connector to be positioned at a distal end of the arm, and retracting the arm results in the power connector being retracted based on the retraction of the arm and the pulling force exerted by the retraction device.

In some embodiments, where the power connector is decoupled from the power connector interface independently of the power connector arm being extended, the retraction device can pull the power connector to a retracted position in the vehicle.

At 526, the ego-vehicle is navigated to a determined proximity position relative to the peloton. Such navigation can be implemented as part of one or more of navigating the ego-vehicle to exit the peloton, navigating the vehicle to a new peloton position in accordance with a new target peloton configuration, etc. At 528, a determination is made regarding whether rejoining the peloton at a new peloton position, in accordance with a peloton configuration, is authorized. If not, at 530, the ego-vehicle is navigated along the driving route, independently of the peloton. If so, at 532, the vehicle is navigated to the new peloton position.

Figure 6:
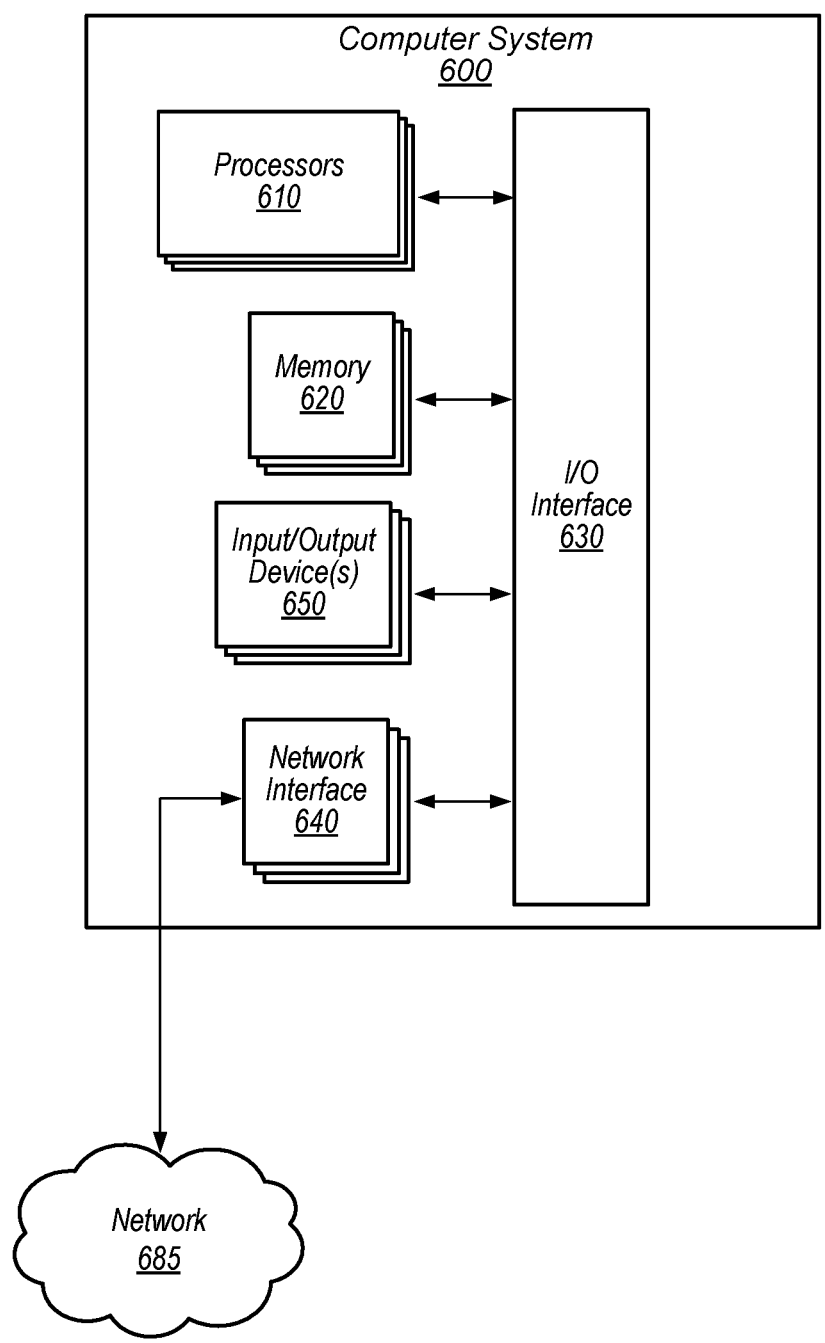
FIG. 6 illustrates a computer system that may be configured to include or execute any or all of the embodiments described herein.

FIG. 6 illustrates an example computer system 600 that may be configured to include or execute any or all of the embodiments described above. In different embodiments, computer system 600 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of a vehicle navigation system (VNS), vehicle power management system, power connection assembly, some combination thereof, etc., as described herein, may be executed in one or more computer systems 600, which may interact with various other devices. Note that any component, action, or functionality described above with respect to FIGS. 1 through 5 may be implemented on one or more computers configured as computer system 600 of FIG. 6, according to various embodiments. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices, which can include one or more user interface (also referred to as "input interface") devices. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 610 may commonly, but not necessarily, implement the same ISA.

System memory 620 may be configured to store program instructions, data, etc. accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 620 may be configured to implement some or all of an ANS, incorporating any of the functionality described above. Additionally, existing automotive component control data of memory 620 may include any of the information or data structures described above. In some embodiments, program instructions and/or data may be received, sent or stored upon different types of computer-accessible media or on similar media separate from system memory 620 or computer system 600. While computer system 600 is described as implementing the functionality of functional blocks of previous Figures, any of the functionality described herein may be implemented via such a computer system.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network 685 (e.g., carrier or agent devices) or between nodes of computer system 600. Network 685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 600. Multiple input/output devices may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Memory 620 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
a power connector assembly, installed in a vehicle, which is configured to electrically couple at least one internal battery installed in the vehicle to at least one power source installed in at least one additional vehicle while the vehicles are navigating along a roadway, wherein the power connector assembly comprises:
a power connector, coupled to the at least one internal battery installed in the vehicle via at least a power cable, which is configured to couple with a power connector interface installed in the at least one additional vehicle, wherein the power connector interface is electrically coupled to the at least one power source; and
a power connector arm which is configured to extend the power connector from a retracted position in the vehicle, and across a spacing distance between the vehicle and the at least one additional vehicle, to couple the power connector to the power connector interface, such that the at least one internal battery is electrically coupled to the at least one power source.

2. The apparatus of claim 1, wherein:
the power connector assembly comprises:
a power converter which electrically couples the at least one battery installed in the vehicle to the power cable, wherein the power converter is configured to:
step up a voltage of electrical power supplied from the at least one internal battery to the at least one additional vehicle via the power cable; and
step down a voltage of electrical power received from the at least one additional vehicle via the power cable and supplied to the at least one internal battery.

3. The apparatus of claim 1, wherein:
the power connector arm comprises a reversibly extendable arm; and
to electrically couple at least one internal battery to the at least one power source while the vehicle is navigating along a roadway, the power connector assembly is configured to:
extend the power connector arm from the retracted position in the vehicle to an extended position, such that the power connector is positioned proximate to the power connector interface; and
subsequently to the power connector coupling with the power connector interface, retract the power connector arm to the retracted position, such that the power connector remains coupled to the power connector interface and the power cable extends, across the spacing distance, to the power connector coupled to the power connector interface.

4. The apparatus of claim 1, wherein:
to electrically decouple the vehicle from the at least one additional vehicle, the power connector assembly is configured to:

extend the power connector arm, from the retracted position and across the spacing distance to the power connector, while the power connector is coupled to the power connector interface;

decouple the power connector from the power connector interface; and retract the power connector arm to the retracted position, such that the power connector is retracted to the retracted position.

5. The apparatus of claim 1, wherein:

the power connector assembly is further configured to:

extend the power connector from the retracted position, such that the power connector is positioned proximate to the power connector interface, in response to receipt, at the vehicle, of an authorization signal which includes information indicating authorization of electrically coupling the at least one internal battery installed in the vehicle with the power source installed in the at least one additional vehicle.

6. The apparatus of claim 1, wherein:

the power connector assembly is further configured to electrically decouple the vehicle from the at least one additional vehicle in response to receipt, at the vehicle, of a decoupling signal which includes a command to electrically decouple from the power source installed in the at least one additional vehicle.

7. The apparatus of claim 2, wherein the power converter causes electrical power which is exchanged between vehicles via the power connector assembly to have a higher voltage, and a lower current, than the electrical power received and supplied at the battery.

8. The apparatus of claim 1, further comprising:

a retraction device configured to exert a pulling force on the power connector via a cable between the retraction device and the power connector so as to retract the power connector to the retracted position from a coupled position with the power connector interface.

9. The apparatus of claim 1, wherein the power connector arm comprises an articulated arm device, or a telescoping cylindrical rod device.

10. The apparatus of claim 1, wherein the power connector includes a magnetic coupling component which couples the power connector to the power connector interface based on magnetic force attraction between the power connector and the power connector interface when power connector approaches the power connector interface.

11. A vehicle, comprising:

a power connector assembly, installed in the vehicle, which is configured to electrically couple at least one internal battery installed in the vehicle to at least one power source installed in at least one additional vehicle while the vehicles are navigating along a roadway, wherein the power connector assembly comprises:

a power connector, coupled to the at least one internal battery installed in the vehicle via at least a power cable, which is configured to couple with a power connector interface installed in the at least one additional vehicle, wherein the power connector interface is electrically coupled to the at least one power source; and a power connector arm which is configured to extend the power connector from a retracted position in the vehicle, and across a spacing distance between the vehicle and the at least one additional vehicle, to couple the power connector to the power connector interface, such that the at least one internal battery is electrically coupled to the at least one power source.

12. The vehicle recited in claim 11, wherein the power connector assembly comprises a power converter which electrically couples the at least one battery installed in the vehicle to the power cable, and wherein the power converter is configured to step up a voltage of electrical power supplied from the at least one internal battery to the at least one additional vehicle via the power cable.

13. The vehicle recited in claim 11, wherein the power connector assembly comprises a power converter which electrically couples the at least one battery installed in the vehicle to the power cable, and wherein the power converter is configured to step down a voltage of electrical power received from the at least one additional vehicle via the power cable and supplied to the at least one internal battery.

14. The vehicle recited in claim 11, wherein:

the power connector arm comprises a reversibly extendable arm; and to electrically couple at least one internal battery to the at least one power source while the vehicle is navigating along a roadway, the power connector assembly is configured to extend the power connector arm from the retracted position in the vehicle to an extended position, such that the power connector is positioned proximate to the power connector interface.

15. The vehicle recited in claim 14, wherein the power connector assembly is further configured to:

subsequently to the power connector coupling with the power connector interface, retract the power connector arm to the retracted position, such that the power connector remains coupled to the power connector interface and the power cable extends, across the spacing distance, to the power connector coupled to the power connector interface.

16. The vehicle recited in claim 11, wherein to electrically decouple the vehicle from the at least one additional vehicle, the power connector assembly is configured to:

extend the power connector arm, from the retracted position and across the spacing distance to the power connector, while the power connector is coupled to the power connector interface;

decouple the power connector from the power connector interface; and retract the power connector arm to the retracted position, such that the power connector is retracted to the retracted position.

17. The vehicle recited in claim 11, wherein:

the power connector assembly is further configured to:

extend the power connector from the retracted position, such that the power connector is positioned proximate to the power connector interface, in response to receipt, at the vehicle, of an authorization signal which includes information indicating authorization of electrically coupling the at least one internal battery installed in the vehicle with the power source installed in the at least one additional vehicle.

18. The vehicle recited in claim 11, wherein:

the power connector assembly is further configured to electrically decouple the vehicle from the at least one additional vehicle in response to receipt, at the vehicle, of a decoupling signal which includes a command to electrically decouple from the power source installed in the at least one additional vehicle.

19. The vehicle recited in claim 11, the vehicle further comprising:

one or more computing devices to control transfer of electrical power between the power source of the additional vehicle and the battery of the vehicle.

20. The vehicle recited in claim 11,
the vehicle further comprising one or more computing devices, and
wherein to control the power connector arm of the vehicle to couple the power connector to the power connector interface of the at least one additional vehicle, the one or more computing devices are to:
   determine that the vehicle is located proximate to the at least one additional vehicle;
   control extension of the power connector arm from a retracted position in the vehicle to an extended position, such that the power connector arm extends the power connector to a position proximate to the power connector interface; and
   subsequent to a determination that the power connector is positioned proximate to the power connector interface, cause the power connector to be coupled to the power connector interface such that the battery of the vehicle is coupled to the at least one power source of the at least one additional vehicle.

* * * * *